(12) United States Patent
Ohmori et al.

(10) Patent No.: US 9,947,954 B2
(45) Date of Patent: Apr. 17, 2018

(54) FUEL CELL STACK

(71) Applicant: NGK INSULATORS, LTD., Nagoya-shi, Aichi (JP)

(72) Inventors: Makoto Ohmori, Nagoya (JP); Shinji Fujisaki, Kuwana (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 15/350,786

(22) Filed: Nov. 14, 2016

(65) Prior Publication Data
US 2017/0062864 A1 Mar. 2, 2017

Related U.S. Application Data

(63) Continuation of application No. PCT/JP2016/069944, filed on Jul. 5, 2016.

(30) Foreign Application Priority Data

Jul. 7, 2015 (JP) .................................. 2015-135971

(51) Int. Cl.
*H01M 8/10* (2016.01)
*H01M 8/2428* (2016.01)
(Continued)

(52) U.S. Cl.
CPC ....... *H01M 8/2428* (2016.02); *H01M 8/1253* (2013.01); *H01M 8/2425* (2013.01);
(Continued)

(58) Field of Classification Search
CPC .... H01M 8/2428; H01M 8/1253; H01M 8/24; H01M 8/12; H01M 2008/1293;
(Continued)

(56) References Cited

U.S. PATENT DOCUMENTS

| 5,169,513 A | * | 12/1992 | Mase ...................... B32B 18/00 204/412 |
| 7,820,332 B2 | * | 10/2010 | Badding .............. H01M 8/1253 429/400 |
| 2004/0081878 A1 | * | 4/2004 | Mardilovich ....... H01M 8/0247 429/456 |

FOREIGN PATENT DOCUMENTS

| JP | 2005-187241 A | 7/2005 |
| JP | 2008-135272 A | 6/2008 |
| JP | 2014-216237 A | 11/2014 |

OTHER PUBLICATIONS

Translation of International Search Report dated Aug. 23, 2016 for the corresponding International Application No. PCT/JP2016/069944.
(Continued)

*Primary Examiner* — Lisa S Park
(74) *Attorney, Agent, or Firm* — Global IP Counselors, LLP

(57) ABSTRACT

A fuel cell stack includes seven current collecting members and six fuel cells that are alternate stacked with reference to the stacking direction. Each of the six fuel cells includes an anode, a cathode and a solid electrolyte layer that is disposed between the anode and the cathode and contains a zirconia-based material as a main component. The six fuel cells include a first fuel cell disposed in the center with reference to the stacking direction, and a second fuel cell disposed in one end with reference to the stacking direction. An intensity ratio of tetragonal crystal zirconia to cubic crystal zirconia in a Raman spectrum of the solid electrolyte layer of the first fuel cell is greater than an intensity ratio of tetragonal crystal zirconia to cubic crystal zirconia in a Raman spectrum of the solid electrolyte layer of the second fuel cell.

4 Claims, 1 Drawing Sheet

(51) Int. Cl.
*H01M 8/1253* (2016.01)
*H01M 8/2425* (2016.01)
*H01M 8/124* (2016.01)

(52) U.S. Cl.
CPC ............... *H01M 2008/1293* (2013.01); *H01M 2300/0077* (2013.01); *Y02E 60/525* (2013.01)

(58) Field of Classification Search
CPC ............ H01M 8/2432; H01M 8/0247; H01M 8/0223; H01M 4/9033; H01M 8/2425; H01M 4/9025; H01M 4/8889; H01M 2300/0077; H01M 2300/0088; C04B 35/486; C04B 2235/75; C04B 2235/3246; C04B 2235/3225; C04B 2235/765; C04B 2235/762; Y02P 70/56; Y02E 60/525
See application file for complete search history.

(56) References Cited

OTHER PUBLICATIONS

International Search Report dated Aug. 23, 2016 for the corresponding International Application No. PCT/JP2016/069944.

\* cited by examiner

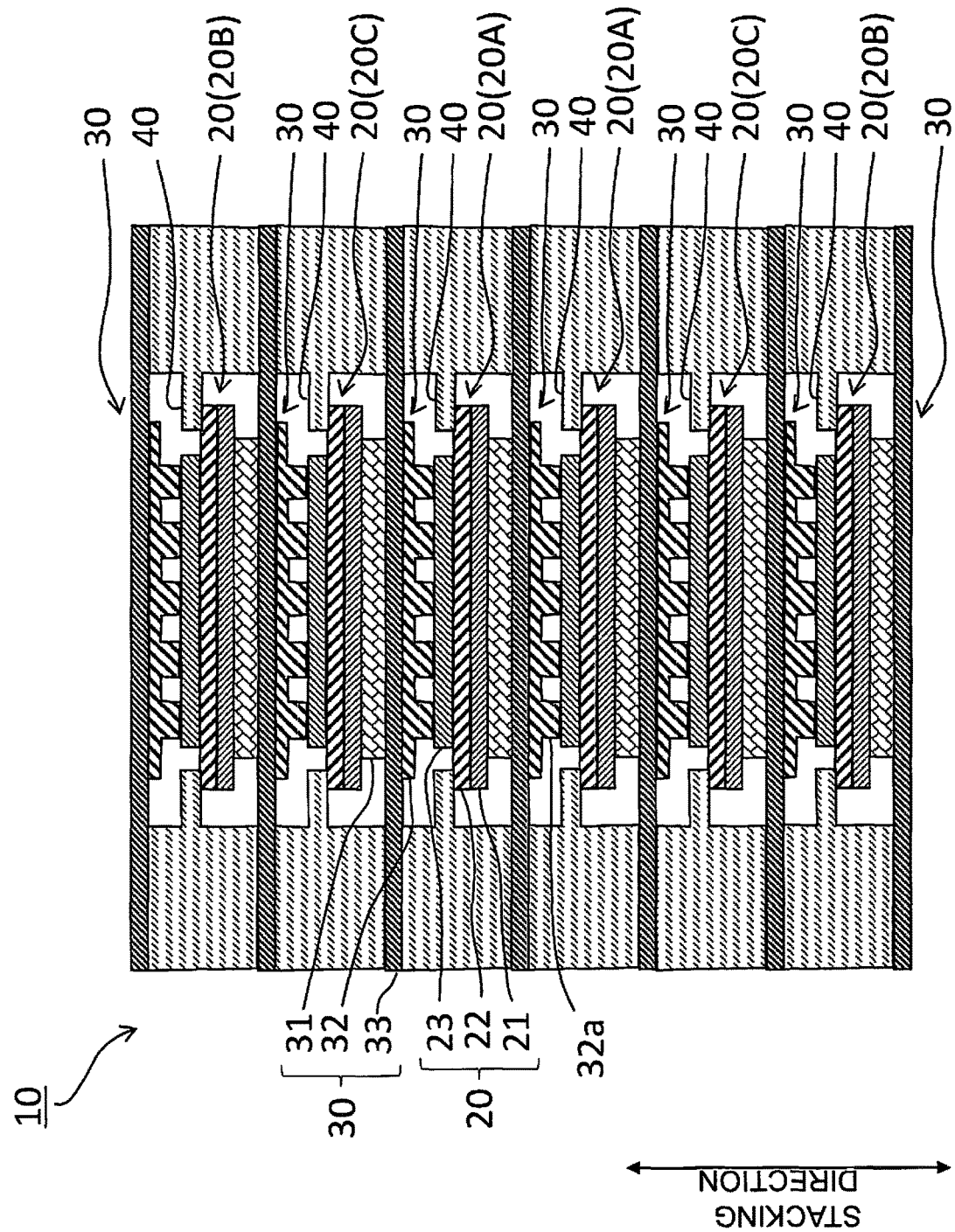

FUEL CELL STACK

TECHNICAL FIELD

The present invention relates to a fuel cell stack.

BACKGROUND ART

A fuel cell stack is known to be typically configured by alternate stacking of a tabular fuel cell and a metal current collecting member (For example, reference is made to Japanese Patent Application Laid-Open No. 2008-135272).

The fuel cell includes an anode, a cathode and a solid electrolyte layer between the anode and the cathode.

SUMMARY OF INVENTION

However, when a fuel cell stack is heated at startup of operation of the fuel cell stack by use of a heat source that is disposed above and below the fuel cell stack, the fuel cells that are positioned on both ends with reference to the stacking direction undergo rapid temperature increase, whereas a fuel cell that is positioned in the center with reference to the stacking direction does not undergo rapid temperature increase. On the other hand, since the thermal conductivity of a current collecting member is high when compared to the fuel cell, a current collecting member that is positioned in the center with reference to the stacking direction undergoes rapid temperature increase in the same manner as the current collecting members that are positioned on both ends with reference to the stacking direction.

As a result, there is a risk of damage to the solid electrolyte layer of the fuel cell that is positioned in the center with reference to the stacking direction as a result of production of stress between the fuel cell and the current collecting member, because there is a difference in the degree of thermal expansion of a fuel cell and a current collecting member that is connected thereto.

The present invention is proposed in light of the above circumstances, and has the object of providing a fuel cell stack that can inhibit damage to the solid electrolyte layer of a fuel cell that is positioned in the center with reference to the stacking direction.

The fuel cell stack according to the present invention comprises a plurality of current collecting members and a plurality of fuel cells that are alternate stacked with reference to the stacking direction. Each of the respective plurality of fuel cells includes an anode, a cathode and a solid electrolyte layer that is disposed between the anode and the cathode and contains a zirconia-based material as a main component. The plurality of fuel cells includes a first fuel cell disposed in the center with reference to the stacking direction, and a second fuel cell disposed in one end with reference to the stacking direction. A first intensity ratio of tetragonal crystal zirconia to cubic crystal zirconia in a Raman spectrum of the solid electrolyte layer of the first fuel cell is greater than a second intensity ratio of tetragonal crystal zirconia to cubic crystal zirconia in a Raman spectrum of the solid electrolyte layer of the second fuel cell.

Advantageous Effects of Invention

The present invention provides a fuel cell stack that can inhibit damage to the solid electrolyte layer of a fuel cell that is positioned in the center with reference to the stacking direction.

BRIEF DESCRIPTION OF DRAWINGS

FIG. 1 is a cross sectional view that schematically illustrates a configuration of a fuel cell stack.

DESCRIPTION OF EMBODIMENTS

An embodiment of the present invention will be described below making reference to the FIGURES. Those aspects of configuration in the following description of the FIGURES that are the same or similar are denoted by the same or similar reference numerals. However, the FIGURES are merely illustrative, and the actual ratios or the like of the respective dimensions may differ. Therefore, the specific dimensions or the like should be determined by making reference to the following description. Alternatively, it is naturally the case that portions are included that exhibit a different ratio or relationship between dimensions in the respective FIGURES.

Configuration of Fuel Cell Stack 10

A configuration of a fuel cell stack 10 will be described making reference to the FIGURES. FIG. 1 is a cross sectional view that schematically illustrates a configuration of the fuel cell stack 10.

The fuel cell stack 10 comprises six fuel cells 20, seven current collecting members 30 and six separators 40.

The six fuel cells 20 and seven current collecting members 30 are stacked alternately with reference to a stacking direction. Each separator 40 is disposed to enclose each fuel cell 20. The fuel cell stack 10 is fastened by a bolt that passes in the stacking direction through the six separators 40 and the seven connectors 33 that are described below.

The six fuel cells 20 are configured as a so-called solid oxide fuel cell (SOFC). The six fuel cells 20 respectively have a tabular configuration.

The six fuel cells 20 include two first fuel cells 20A positioned in the center with reference to the stacking direction, two second fuel cells 20B positioned on both ends with reference to the stacking direction, and two third fuel cells 20C positioned between the first fuel cells 20A and the second fuel cells 20B. The interval between the upper first fuel cell 20A of the two first fuel cells 20A and the upper end second fuel cell 20B with reference to the stacking direction is approximately the same as the interval between the lower first fuel cell 20A and the lower end second fuel cell 20B with reference to the stacking direction.

The number of fuel cells 20 may be suitably selected, so long as the fuel cell stack 10 includes provision of three or more fuel cells 20. In the present embodiment, since the fuel cell stack 10 is provided with an even number of fuel cells 20, although two first fuel cells 20A are positioned in the center with reference to the stacking direction, there is no limitation in this regard. When an odd number of fuel cells 20 is provided in the fuel cell stack 10, one first fuel cell 20A is provided that is positioned in the center with reference to the stacking direction.

In the present embodiment, the fuel cell stack 10 is provided with six fuel cells 20, and two third fuel cells 20C. However there is no limitation in this regard. When the fuel cell stack 10 is provided with seven or more fuel cells 20, there are four or more third fuel cells 20C, and when the fuel cell stack 10 is provided with no more than four fuel cells 20, there are no more than two third fuel cells 20C. When there is only provision of three fuel cells 20 in the fuel cell stack 10, the third fuel cell 20C is omitted.

Configuration of Fuel Cell 20

The fuel cell 20 includes an anode 21, a solid electrolyte layer 22 and a cathode 23. The anode 21, the solid electrolyte layer 22 and the cathode 23 are stacked in order with reference to the stacking direction.

The anode 21 functions as the anode for the fuel cell 20. The anode 21 is a porous body that exhibits superior fuel gas permeability. The thickness of the anode 21 may be configured as 0.2 mm to 5.0 mm. The anode 21 may be for example configured by NiO (nickel oxide)-8YSZ (8 mol % of yttria-stabilized zirconia). When NiO is included in the anode 21, at least a portion of the NiO may be reduced to Ni during operation of the fuel cell 20.

The solid electrolyte layer 22 is fixed to the separator 40. The solid electrolyte layer 22 is disposed between the anode 21 and the cathode 23. The thickness of the solid electrolyte layer 22 may be configured as 3 micrometers to 30 micrometers. The solid electrolyte layer 22 contains a zirconia-based material as a main component. The zirconia-based material includes cubic crystal zirconia and tetragonal crystal zirconia.

In the present embodiment, the term such that composition X "contains as a main component" composition Y means that composition Y occupies greater than or equal to 70 wt % of the total of composition X.

Cubic crystal zirconia is zirconia in which the crystal phase is mainly cubic crystals. Cubic crystal zirconia for example includes for example 8YSZ, 10YSZ (10 mol % yttria stabilized zirconia).

Tetragonal crystal zirconia is zirconia in which the crystal phase is mainly tetragonal crystals. Tetragonal crystal zirconia includes for example zirconia stabilized with less than or equal to 3 mol % of yttria such as 2.5YSZ (2.5 mol % yttria stabilized zirconia) or 3YSZ (3 mol % yttria stabilized zirconia). The electric conductivity of the tetragonal crystal zirconia is less than the electric conductivity of the cubic crystal zirconia.

The concentration difference of tetragonal crystal zirconia in the solid electrolyte layer 22 of the first to third fuel cells 20A to 20C will be described below. The distribution of tetragonal crystal zirconia in the solid electrolyte layer 22 of the first fuel cell 20A will be described below with reference to Distribution Example 1 and Distribution Example 2.

The cathode 23 is disposed on the solid electrolyte layer 22. The cathode 23 functions as a cathode for the fuel cell 20. The cathode 23 is a porous body that exhibits superior oxidant gas permeation. The thickness of the cathode 22 may be configured to 5 micrometers to 50 micrometers.

The main component of the cathode 23 may be a perovskite composite oxide including at least one of La or Sr at the A site and that is expressed by the general formula $ABO_3$. This type of perovskite composite oxide includes LSCF ((La, Sr)(Co, Fe)$O_3$: lanthanum strontium cobalt ferrite), LSF: ((La, Sr) FeO$_3$: lanthanum strontium ferrite), LSC: ((La, Sr)CoO$_3$: lanthanum strontium cobaltite), LNF ((La (Ni, Fe)O$_3$: lanthanum nickel ferrite), and LSM ((La, Sr) MnO$_3$: lanthanum strontium manganate), or the like. However there is no limitation in this regard.

Configuration of Current Collecting Member 30

The current collecting member 30 electrically connects fuel cells 20, and isolates fuel gas and oxidant gas. The current collecting member 30 includes an anode current collecting body 31, a cathode current collecting body 32 and a connector 33.

The anode current collecting body 31 is disposed between the anode 21 and the connector 33. The anode current collecting body 31 electrically connects the anode 21 and the connector 33. The anode current collecting body 31 may mechanically connect the anode 21 and the connector 33 through a conductive bonding agent. The anode current collecting body 31 is configured from a material that exhibits conductivity. The anode current collecting body 31 is configured with a shape that enables supply of fuel gas to the anode 21. A nickel mesh member for example may be used as the anode current collecting body 31.

The cathode current collecting body 32 is disposed opposite to the anode current collecting body 31 to sandwich the connector 33. The cathode current collecting body 32 is disposed between the cathode 23 and the connector 33. The cathode current collecting body 32 electrically connects the cathode 23 and the connector 33. The cathode current collecting body 32 includes a plurality of connection portions 32a that are electrically connected with the cathode 23. The plurality of connection portions 32a is disposed in a matrix configuration. Each connection portion 32a projects towards the side of the cathode 23. The connection portions 32a may be mechanically connected with the cathode 23 through a conductive bonding agent. The cathode current collecting body 32 is configured from a material that exhibits conductivity. The cathode current collecting body 32 is configured with a shape that enables supply of oxidant gas to the cathode 23. A stainless steel (SUS430 or the like) tabular member that contains chromium and iron for example may be used as the cathode current collecting body 32.

The connector 33 is disposed between the anode current collecting body 31 and the cathode current collecting body 32. The connector 33 is configured from a material that exhibits conductivity. A stainless steel tabular member that contains chromium and iron for example may be used as the connector 33. A cavity is formed for the supply of fuel gas between the connector 33 and the anode 21. A cavity is formed for the supply of oxidant gas between the connector 33 and the cathode 23.

Concentration of Tetragonal Crystal Zirconia in Solid Electrolyte Layer 22 of First to Third Fuel Cells 20A to 20C The concentration ratio of tetragonal crystal zirconia to cubic crystal zirconia in the solid electrolyte layer 22 of the first fuel cell 20A is higher than the concentration ratio of tetragonal crystal zirconia to cubic crystal zirconia in the solid electrolyte layer 22 of the second fuel cell 20B. Furthermore, the concentration ratio of tetragonal crystal zirconia to cubic crystal zirconia in the solid electrolyte layer 22 of the third fuel cell 20C is preferably lower than the concentration ratio of tetragonal crystal zirconia to cubic crystal zirconia in the solid electrolyte layer 22 of the first fuel cell 20A. The concentration ratio of tetragonal crystal zirconia to cubic crystal zirconia in the solid electrolyte layer 22 of the third fuel cell 20C is preferably higher than the concentration ratio of tetragonal crystal zirconia to cubic crystal zirconia in the solid electrolyte layer 22 of the second fuel cell 20B.

The concentration ratio of tetragonal crystal zirconia to cubic crystal zirconia in the solid electrolyte layer 22 can be obtained by Raman Spectrum analysis as described below.

Firstly a Raman spectrum is acquired at five positions that are equally divided in a planar direction that is perpendicular to the thickness direction of the solid electrolyte layer 22 in a cross section that is parallel to the thickness direction (same as the stacking direction) of the solid electrolyte layer 22. A Raman spectrum may be obtained by use of a micro-laser Raman spectroscopic device manufactured by Horiba Ltd (model: LabRAM ARAMIS).

Next, a ratio of the spectral intensity of the tetragonal crystal zirconia to the spectral intensity of the cubic crystal zirconia (referred to below for the sake of convenience as "intensity ratio") is calculated by analyzing the Raman spectra for the respective five positions by use of the respectively unique Raman spectra (known spectral data) for tetragonal crystal zirconia and cubic crystal zirconia. A CLS method that is a known method for inferring a chemical type based on Raman spectra is used as the method of analyzing the Raman spectrum based on known spectral data.

Next, the "intensity ratio of the tetragonal crystal zirconia relative to the cubic crystal zirconia" in the solid electrolyte layer 22 respectively of the first to the third fuel cells 20A to 20C is calculated by taking the arithmetic average of the intensity ratios calculated respectively for the Raman spectra for the five positions. A first intensity ratio R1 is an indicator that shows the tetragonal crystal zirconia concentration ratio (abundance ratio) relative to cubic crystal zirconia in a center 22A of the solid electrolyte layer 22.

The solid electrolyte layer 22 of the first fuel cell 20A that is positioned in the center with reference to the stacking direction contains cubic crystal zirconia as a main component, and contains tetragonal crystal zirconia as a secondary component. Although there is no particular limitation on the value of the intensity ratio of tetragonal crystal zirconia relative to cubic crystal zirconia in a Raman spectrum of the solid electrolyte layer 22 of the first fuel cell 20A, it may be configured as greater than or equal to 0.02 and less than or equal to 1.1, and is preferably greater than or equal to 0.05 and less than or equal to 0.8.

The solid electrolyte layer 22 of the second fuel cell 20B that is positioned at one end with reference to the stacking direction contains cubic crystal zirconia as a main component. Although the solid electrolyte layer 22 of the second fuel cell 20B may contain tetragonal crystal zirconia as a secondary component, the tetragonal crystal zirconia may be omitted. Although there is no particular limitation on the intensity ratio of tetragonal crystal zirconia relative to cubic crystal zirconia in a Raman spectrum of the solid electrolyte layer 22 of the second fuel cell 20B, it may be configured as greater than or equal to 0 and less than or equal to 0.25, and is preferably greater than or equal to 0 and less than or equal to 0.2.

The solid electrolyte layer 22 of the third fuel cell 20C that is positioned between the first fuel cell 20A and the second fuel cell 20B contains cubic crystal zirconia as a main component. Although the solid electrolyte layer 22 of the third fuel cell 20C may omit tetragonal crystal zirconia as a secondary component, it is preferred that the tetragonal crystal zirconia is contained as a secondary component. Although there is no particular limitation on the intensity ratio of tetragonal crystal zirconia relative to cubic crystal zirconia in a Raman spectrum of the solid electrolyte layer 22 of the third fuel cell 20C, it may be configured as greater than or equal to 0 and less than or equal to 0.5, and is preferably greater than or equal to 0 and less than or equal to 0.4.

In the present embodiment, the intensity ratio of the solid electrolyte layer 22 in the first fuel cell 20A is greater than the intensity ratio of the solid electrolyte layer 22 in the second fuel cell 20B. This is due to the fact that, in the solid electrolyte layer 22 in the first fuel cell 20A, cubic crystal zirconia particles can be strongly connected by tetragonal zirconia particles that have a small particle diameter when compared to cubic crystal zirconia. In this manner, strengthening of the framework structure in the solid electrolyte layer 22 in the first fuel cell 20A inhibits damage to the solid electrolyte layer 22 in the first fuel cell 20A that tends to produce stress as a result of a difference in the degree of thermal expansion with the current collecting member 30 during startup of operation of the fuel cell stack 10.

Furthermore, the intensity ratio of the solid electrolyte layer 22 in the third fuel cell 20C is preferably smaller than the intensity ratio of the solid electrolyte layer 22 in the first fuel cell 20A, and larger than the intensity ratio in the solid electrolyte layer 22 in the second fuel cell 20B. In this manner, strengthening of the framework structure in the solid electrolyte layer 22 in the third fuel cell 20C inhibits damage to the solid electrolyte layer 22 in the third fuel cell 20C that tends to produce more stress than the second fuel cell 20B. Furthermore, it is possible to inhibit of reduction of the electric conductivity of the solid electrolyte layer 22 in the third fuel cell 20C by inhibiting the introduced amount of tetragonal crystal zirconia in the solid electrolyte layer 22 in the third fuel cell 20C that is more resistant to stress production than the first fuel cell 20A.

In the Raman spectrum that is acquired at the five positions in the thickness direction in the first fuel cell 20A, the spectral intensity ratio of tetragonal crystal zirconia preferably takes a maximum value in the Raman spectrum detected at a position within 3 micrometers from the anode 21. In this manner, since it is possible to strengthen the framework structure particularly on the side near the cathode 21 of the solid electrolyte layer 22, it is possible to further inhibit damage in proximity to the interface with the anode 21 that exhibits a tendency to expand or contract as a result of oxidation and reduction reactions.

Method of Manufacturing Fuel Cell Stack 10

Next, an example of a method of manufacturing a fuel cell stack 10 will be described.

Firstly, an anode slurry is prepared by mixing NiO powder, a ceramic powder, a binder (for example, PVA) and a pore forming agent (for example, PMMA) in a ball mill. A mixed powder is prepared by drying the anode slurry in a nitrogen atmosphere, and uniaxial pressing is applied to the mixed powder to form green body for a tabular anode 21.

Next, a slurry for the solid electrolyte layer is prepared by mixing terpineol and a binder with a cubic crystal zirconia powder. When preparing the solid electrolyte layer 22 for the first fuel cell 20A, tetragonal crystal zirconia powder is added. When preparing the solid electrolyte layer 22 for the second fuel cell 20B or the third fuel cell 20C, tetragonal crystal zirconia powder may be added, but an adjustment is performed so that the content ratio is lower than the slurry for the solid electrolyte layer for the first fuel cell 20A.

Next, a green body for the solid electrolyte layer 22 is formed by coating the slurry for the solid electrolyte layer using a screen printing method or the like onto the green body for the anode 21. At this time, when there is an intention to increase the tetragonal crystal zirconia concentration on the cathode 21 side of the solid electrolyte layer 22 of the first fuel cell 20A, after coating the slurry for the solid electrolyte layer that contains tetragonal crystal zirconia, a slurry for the solid electrolyte layer that exhibits a lower content ratio of tetragonal crystal zirconia, or a slurry for the solid electrolyte layer that does not contain tetragonal crystal zirconia may be coated.

Next, the green bodies for the anode 21 and the solid electrolyte layer 22 are cofired (1300 degrees C. to 1600 degrees C., 2 to 20 hours) to thereby form a co-fired body for the anode 21 and the solid electrolyte layer 22.

Next, a cathode slurry is prepared by mixing terpineol and a binder with a cathode powder. Then, the green body for the cathode 23 is formed by coating the cathode slurry using a screen printing method or the like onto the solid electrolyte layer 22.

Next, the green body for the cathode 23 is fired (1000 degrees C. to 1100 degrees C., 1 to 10 hours) to thereby form the cathode 23. The fuel cell 20 is completed in the above manner.

Next six fuel cells 20 are bonded with six separators 40.

Seven current collecting members 30 are prepared by bonding the anode current collecting body 31 and the cathode current collecting body 32 onto both principal surfaces of the seven connectors 33.

Next, the seven current collecting members 30 and six fuel cells 20 bonded by the separators 40 are disposed in an alternating configuration with reference to the stacking direction. At that time, a sealing glass material may be interposed between the connector 33 and the fuel cell 20.

Next, an integrated configuration is realized in a compressed state in the stacking direction by fixing a bolt into a through hole that passes through the separator 40 and the connector 33. The outer surface of the stacked body may be covered using a sealing glass material.

Other Embodiments

The present invention is not limited to the above embodiment, and various changes or modifications may be added within a scope that does not depart from the scope of the invention.

Although there is no particular disclosure in the above embodiment, the fuel cell 20 may include provision of a diffusion prevention layer provided between the solid electrolyte layer 22 and the cathode 23. The diffusion prevention layer may be configured by a composite oxide that contains Zr and one or more rare earth elements such as Ce, Gd or the like. This type of diffusion prevention layer inhibits diffusion of the constituent elements of the cathode 23 into the solid electrolyte layer 22.

In the present embodiment, the cathode current collecting body 32 includes connection portions 32a that is connected with the cathode 23. The anode current collecting body 31 may include connection portions that are partially connected with the anode 21.

In the present embodiment, the current collecting member 30 is configured by the anode current collecting body 31 and the cathode current collecting body 32 and the connector 33. However, a known separator (for example as disclosed in Japanese Patent Application Laid-Open No. 2001-196077) may be used as the current collecting member.

Although there is no particular disclosure in the above embodiment, the concentration ratio of tetragonal crystal zirconia to cubic crystal zirconia in the solid electrolyte layer 22 of the first fuel cell 20A may be higher in a central portion with reference to a planar direction. Furthermore, the concentration ratio of tetragonal crystal zirconia to cubic crystal zirconia in the solid electrolyte layer 22 of the first fuel cell 20A may be higher in portions that overlap with reference to the stacking direction with the connection portions 32a of the cathode current collecting body 32. Furthermore, when the anode current collecting body 31 includes the connection portions that are partially connected with the anode 21, the concentration ratio of tetragonal crystal zirconia to cubic crystal zirconia in the solid electrolyte layer 22 of the first fuel cell 20A may be higher in the portion that overlaps in the stacking direction with the connection portions of the anode current collecting body 31.

EXAMPLES

Preparation of Sample No. 1

A fuel cell stack according to Sample No. 1 is prepared as described below.

Firstly, a mixed powder is prepared by drying a slurry of a mixture of IPA and a compounding powder of a pore-forming agent (PMMA), 8YSZ powder and NiO powder in a nitrogen atmosphere.

Next, uniaxial pressing (compaction pressure 50 MPa) is applied to the mixed powder to form a plate, and a green body for the anode is prepared by further consolidation of the plate by use of a CIP (compaction pressure: 100 MPa).

Next, a slurry for the solid electrolyte layer is prepared by mixing terpineol and a binder with a cubic crystal zirconia powder. In Sample No. 1, tetragonal crystal zirconia powder is not added to the slurry for the solid electrolyte layer.

Next, a green body for the solid electrolyte layer is formed by coating the slurry for the solid electrolyte layer using a screen printing method onto the green body for the anode.

Next, the green bodies for the anode and the solid electrolyte layer are cofired (1400 degrees C., 2 hours) to thereby form a co-fired body for the anode and the solid electrolyte layer. The size of the anode is length 100 mm by breadth 100 mm and a thickness of 800 micrometers. The size of the solid electrolyte layer is length 100 mm by breadth 100 mm and a thickness of 10 micrometers.

Next, a slurry for the cathode is prepared by mixing terpineol and a binder with LSCF powder. The green body for the cathode is formed by coating the cathode slurry by use of a screen printing method onto the solid electrolyte layer. Thereafter, the green body for the cathode is fired (1100 degrees C., 1 hour) to form the cathode. The size of the cathode is length 90 mm by breadth 90 mm and a thickness of 50 micrometers.

Six fuel cells made in the above manner are prepared, and a stainless steel separator is bonded to each of the six respective fuel cells.

A stainless steel member that includes a nickel mesh and a plurality of protrusions (connection portions with the cathode) is bonded to both principal surfaces respectively of the seven stainless steel plates to thereby prepare seven current collecting members.

Next, the seven current collecting members and the six fuel cells bonded to stainless steel separators are alternately stacked with reference to a stacking direction.

An integrated configuration is realized in a compressed state in the stacking direction by fixing a bolt into a through hole that passes through the separator and the separator.

Preparation of Sample No. 2 to No. 7

In Sample No. 2 to No. 7, two fuel cells positioned in the center with reference to the stacking direction of the six fuel cells are prepared as described below. The fuel cells other than the two fuel cells described below as the same as Sample No. 1.

Firstly, a mixed powder is prepared by drying a slurry of a mixture of IPA and a compounding powder of a pore-forming agent (PMMA), 8YSZ powder and NiO powder in a nitrogen atmosphere.

Next, uniaxial pressing (compaction pressure 50 MPa) is applied to the mixed powder to form a plate, and a green body for the anode is prepared by further consolidation of the plate by use of a CIP (compaction pressure: 100 MPa).

Next, a slurry for the solid electrolyte layer is prepared by mixing terpineol and a binder with a cubic crystal zirconia powder and tetragonal crystal zirconia powder. As shown in Table 1, the intensity ratio of the tetragonal crystal zirconia powder to the cubic crystal zirconia powder in a Raman spectrum of the solid electrolyte layer is adjusted for each sample by adjusting the addition amount of the tetragonal crystal zirconia powder.

Next a green body for the solid electrolyte layer is formed by using a screen printing method to coat the slurry for the solid electrolyte layer onto the green body for the anode.

Next, the green bodies for the anode and the solid electrolyte layer are cofired (1400 degrees C., 2 hours) to thereby form a co-fired body for the anode and the solid electrolyte layer. The size of the anode and the solid electrolyte layer is the same as Sample No. 1.

Next, a slurry for the cathode is prepared by mixing terpineol and a binder with LSCF powder. The green body for the cathode is formed by coating the cathode slurry by use of a screen printing method onto the solid electrolyte layer. Thereafter, the green body for the cathode is fired (1100 degrees C., 1 hour) to form the cathode. The size of the cathode is the same as Sample No. 1.

Two fuel cells made in the above manner and four fuel cells that are the same as Sample No. 1 are prepared, and a stainless steel separator is bonded to the six respective fuel cells.

A stainless steel member that includes a nickel mesh and a plurality of protrusions is bonded to both principal surfaces respectively of the seven stainless steel plates to thereby prepare seven current collecting members.

Next, the seven current collecting members and the six fuel cells bonded to stainless steel separators are alternately stacked with reference to a stacking direction. At that time, two fuel cells that contain tetragonal crystal zirconia in the solid electrolyte layer are disposed in the center with reference to the stacking direction.

An integrated configuration is realized in a compressed state in the stacking direction by fixing a bolt into a through hole that passes through the separator and the separator.
Measurement of Intensity Ratio of Tetragonal Crystal Zirconia to Cubic Crystal Zirconia by Raman Spectroscopy A Raman spectrum is obtained at five positions at equal intervals on a cross section that is parallel to the thickness direction in relation to the solid electrolyte layer of fuel cells that are disposed in the center with reference to the stacking direction and the solid electrolyte layer of fuel cells that are disposed in one end with reference to the stacking direction in Sample No. 1 to No. 7. The intensity ratio of the tetragonal crystal zirconia to the cubic crystal zirconia is calculated by analysis of the Raman Spectrum at each position to thereby obtain a value for the arithmetic mean for the intensity ratios at the five positions. The calculation results are shown in Table 1.

Heat Cycle Testing of Fuel Cell Stack

Heat cycle testing is performed in relation to Sample No. 1 to No. 7.

More specifically, firstly, after increasing the temperature over 90 minutes from ambient temperature to 750 degrees C., the temperature is maintained at 750 degrees C. in a state in which the anode side is supplied with 4% hydrogen gas (4% hydrogen gas relative to Ar gas) to thereby perform reduction processing. The initial output of the fuel cell stack is measured. Then, supply of 4% hydrogen gas is continued and a reducing atmosphere is maintained while the temperature is reduced to less than or equal to 100 degrees C. The step of temperature increase and the step of temperature decrease are taken to be one cycle, and the cycle is repeated 20 times.

Next, He gas is supplied under pressure to the anode side of a fuel cell disposed in the center with reference to the stacking direction to confirm the presence or absence of leakage of He gas to the cathode side. Furthermore, microscopic observation is made of the cross section of the solid electrolyte layer of a fuel cell disposed in the center with reference to the stacking direction to confirm the presence or absence of cracks in the solid electrolyte layer.

The results of the heat cycle testing above are summarized in Table 1. In Table 1, a sample in which the initial output is high (that is to say, the resistance of the solid electrolyte layer is small), and cracks are not produced is evaluated as good (⊚), a sample in which the initial output is relatively low (that is to say, the resistance of the solid electrolyte layer is relatively high), or a sample in which cracks of less than or equal to 5 micrometers that have a low effect on the durability and performance of the fuel cell are produced is evaluated as acceptable (O), and a sample in which cracks of greater than 5 micrometers are produced is evaluated as unacceptable (X).

TABLE 1

| | Solid Electrolyte Layer of Fuel Cell Disposed in Center with Reference to Stacking Direction | | | Solid Electrolyte Layer of Fuel Cell Disposed in One End with Reference to Stacking Direction | | |
|---|---|---|---|---|---|---|
| Sample No. | Cubic Crystal Zirconia | Tetragonal Crystal Zirconia | Intensity Ratio of Tetragonal Crystal Zirconia to Cubic Crystal Zirconia | Intensity Ratio of Tetragonal Crystal Zirconia to Cubic Crystal Zirconia | Result of Heat Cycle Testing | Evaluation |
| 1 | 8YSZ | non | 0 | 0 | Cracking | X |
| 2 | 8YSZ | 3YSZ | 0.02 | 0 | Minute Cracking | O |
| 3 | 10YSZ | 3YSZ | 0.05 | 0 | No Cracking | ⊚ |
| 4 | 8YSZ | 3YSZ | 0.31 | 0.03 | No Cracking | ⊚ |
| 5 | 10YSZ | 3YSZ | 0.55 | 0 | No Cracking | ⊚ |
| 6 | 8YSZ | 3YSZ | 0.80 | 0.06 | No Cracking | ⊚ |
| 7 | 8YSZ | 3YSZ | 1.1 | 0 | No cracking but large resistance | O |

As shown in Table 1, Sample No. 2 to No. 7 in which the intensity ratio in the solid electrolyte layer of a fuel cell disposed in the center with reference to the stacking direction is configured to be larger than an intensity ratio in the solid electrolyte layer of a fuel cell disposed at one end with reference to the stacking direction enable suppression of cracking of the solid electrolyte layer of a fuel cell disposed in the center with reference to the stacking direction. This feature is due to strengthening the framework structure of the solid electrolyte layer due to the strong connection of cubic zirconia particles by tetragonal zirconia particles that have a small particle diameter when compared to cubic crystal zirconia.

As shown in Table 1, it can be seen that cracking of the solid electrolyte layer can be suppressed and resistance in the solid electrolyte layer can be further reduced by configuring the intensity ratio to be greater than or equal to 0.05 and less than or equal to 0.8.

The invention claimed is:

1. A fuel cell stack comprising:
    a plurality of current collecting members and a plurality of fuel cells which are alternately stacked with reference to a stacking direction;
    each of the plurality of fuel cells including an anode, a cathode and a solid electrolyte layer which is disposed between the anode and the cathode, the solid electrolyte layer containing a zirconia-based material as a main component;
    the plurality of fuel cells including a first fuel cell disposed in a center with reference to the stacking direction, and a second fuel cell disposed in one end with reference to the stacking direction; wherein
    an intensity ratio of tetragonal crystal zirconia to cubic crystal zirconia in a Raman spectrum of the solid electrolyte layer of the first fuel cell is greater than an intensity ratio of tetragonal crystal zirconia to cubic crystal zirconia in a Raman spectrum of the solid electrolyte layer of the second fuel cell, and
    the solid electrolyte layer of the first fuel cell comprises cubic crystal zirconia as a main component and further comprises tetragonal crystal zirconia.

2. The fuel cell stack according to claim 1, wherein
    the plurality of fuel cells includes a third fuel cell disposed between the first fuel cell and the second fuel cell, and,
    an intensity ratio of tetragonal crystal zirconia to cubic crystal zirconia in a Raman spectrum of the solid electrolyte layer of the third fuel cell is smaller than the intensity ratio of the first fuel cell, and is greater than an intensity ratio of the second fuel cell.

3. The fuel cell stack according to claim 1, wherein
    the intensity ratio of the first fuel cell is greater than or equal to 0.05 and less than or equal to 0.8.

4. The fuel cell stack according to claim 1, wherein
    the solid electrolyte layer of the second fuel cell contains cubic crystal zirconia as a main component.

* * * * *